(12) United States Patent
Yadav et al.

(10) Patent No.: US 12,476,287 B2
(45) Date of Patent: Nov. 18, 2025

(54) DUAL ELECTROLYTE APPROACH FOR HIGH VOLTAGE BATTERIES

(71) Applicant: URBAN ELECTRIC POWER INC., Pearl River, NY (US)

(72) Inventors: Gautam G. Yadav, Pearl River, NY (US); Jinchao Huang, Pearl River, NY (US); Sanjoy Banerjee, Pearl River, NY (US)

(73) Assignee: URBAN ELECTRIC POWER INC., Pearl River, NY (US)

( * ) Notice: Subject to any disclaimer, the term of this patent is extended or adjusted under 35 U.S.C. 154(b) by 607 days.

(21) Appl. No.: 17/770,780

(22) PCT Filed: Oct. 23, 2020

(86) PCT No.: PCT/US2020/057154
§ 371 (c)(1),
(2) Date: Apr. 21, 2022

(87) PCT Pub. No.: WO2021/081394
PCT Pub. Date: Apr. 29, 2021

(65) Prior Publication Data
US 2022/0384855 A1    Dec. 1, 2022

Related U.S. Application Data

(60) Provisional application No. 62/925,479, filed on Oct. 24, 2019.

(51) Int. Cl.
| | |
|---|---|
| *H01M 10/26* | (2006.01) |
| *H01M 4/02* | (2006.01) |
| *H01M 4/38* | (2006.01) |
| *H01M 4/42* | (2006.01) |
| *H01M 4/46* | (2006.01) |

(Continued)

(52) U.S. Cl.
CPC ...... *H01M 10/26* (2013.01); *H01M 2004/027* (2013.01); *H01M 2004/028* (2013.01);
(Continued)

(58) Field of Classification Search
None
See application file for complete search history.

(56) References Cited

U.S. PATENT DOCUMENTS 6,143,443 A * 11/2000 Kazacos ............... H01M 10/36
429/188
10,749,168 B1 * 8/2020 Johnson ............... H01M 4/368
(Continued)

FOREIGN PATENT DOCUMENTS

WO    2021081394 A1    4/2021

OTHER PUBLICATIONS

Suo et al. "'Water-in-Salt' electrolyte enables high-voltage aqueous lithium-ion chemistries" Science vol. 350, Iss. 6263, pp. 938-943 (2015) (Year: 2015).*

(Continued)

*Primary Examiner* — Lisa S Park
(74) *Attorney, Agent, or Firm* — Andrew M. Metrailer; Conley Rose, P.C.

(57) ABSTRACT

A solid state high voltage battery includes a cathode; an anode; a catholyte solution in contact with the cathode; an anolyte solution in contact with the anode, and a separator disposed between the cathode and the anode. At least one of the catholyte or the anolyte is gelled, and at least one of the catholyte or the anolyte comprises an organic electrolyte, an ionic liquid electrolyte, or water in salt electrolyte.

24 Claims, 2 Drawing Sheets

(51) Int. Cl.
*H01M 4/485* (2010.01)
*H01M 4/58* (2010.01)
*H01M 4/62* (2006.01)

(52) U.S. Cl.
CPC ............ *H01M 4/382* (2013.01); *H01M 4/386* (2013.01); *H01M 4/42* (2013.01); *H01M 4/463* (2013.01); *H01M 4/466* (2013.01); *H01M 4/485* (2013.01); *H01M 4/5825* (2013.01); *H01M 4/625* (2013.01); *H01M 2300/0082* (2013.01); *H01M 2300/0085* (2013.01)

(56) References Cited

U.S. PATENT DOCUMENTS

| | | |
|---|---|---|
| 2005/0164089 A1 | 7/2005 | Iltchev et al. |
| 2008/0070086 A1 | 3/2008 | Fukuchi et al. |
| 2013/0183546 A1* | 7/2013 | Joshi ..................... H01M 6/185 204/252 |
| 2014/0057153 A1 | 2/2014 | Visco et al. |
| 2015/0028516 A1* | 1/2015 | Duong ................ H01M 50/457 264/173.19 |
| 2016/0013463 A1 | 1/2016 | Roumi et al. |
| 2018/0062162 A1 | 3/2018 | Maeda |
| 2019/0115613 A1* | 4/2019 | Manthiram ......... H01M 4/0404 |

OTHER PUBLICATIONS

International Search Report and Written Opinion, dated Jan. 26, 2021, PCT/US2020/057154 filed on Oct. 23, 2020.
International Preliminary Report on Patentability, dated May 5, 2022, PCT/US2020/057154 filed on Oct. 23, 2020.
First Examination Report dated Jan. 6, 2025, India Application No. 202217028641 filed May 18, 2022.

* cited by examiner

DUAL ELECTROLYTE APPROACH FOR HIGH VOLTAGE BATTERIES

CROSS-REFERENCE TO RELATED APPLICATIONS

This application is a filing under 35 U.S.C. 371 as the National Stage of International Application No. PCT/US2020/057154, filed on Oct. 23, 2020, entitled, "DUAL ELECTROLYTE APPROACH FOR HIGH VOLTAGE BATTERIES," claims the benefit of: U.S. Provisional Application No. 62/925,479 filed on October 24, 2019 and entitled "DUAL ELECTROLYTE APPROACH FOR HIGH VOLTAGE BATTERIES", both of which are incorporated herein by reference in its entirety for all purposes.

BACKGROUND

The alkaline battery is widely used because of its superior storage properties and high ionic conductivity compared to acidic or neutral electrolyte. However, these batteries are generally used only once and then discarded because of the inactivity of its raw materials. Also, the energy extracted from these batteries can become low through use because the nominal voltage at which the capacity is extracted is around 1.1 to 1.2V. These characteristics curtail the use of this cheap, safe, nonflammable, and environmentally chemistry to small scale applications. If the voltage of the battery can be increased, a high fraction of the theoretical capacity of the raw materials can be accessed reversibly many times. If the cost of the battery can still be kept low, then this would represent a significant improvement in the field of energy storage systems.

Batteries are energy storage systems and storing the energy in terms of mass (specific energy density) or volume (volumetric energy density) can impact a wide range of applications ranging from personal electronics to grid-based storage. Currently, the batteries that are available lack the necessary energy density and are exorbitantly expensive and unsafe. For example, the two most widely used batteries in the world are lithium-ion and lead acid, which are not ideal solutions. Lithium-ion batteries are dangerous and expensive, while lead acid batteries are toxic and perform poorly. The need for searching new highly energy dense, cheap and safer batteries is important to aid in the energy transition into the next century.

SUMMARY

In an embodiment, a solid state high voltage battery includes a cathode; an anode; a catholyte solution in contact with the cathode; an anolyte solution in contact with the anode, and a separator disposed between the cathode and the anode. At least one of the catholyte or the anolyte is gelled, and at least one of the catholyte or the anolyte comprises an organic electrolyte, an ionic liquid electrolyte, or water in salt electrolyte.

In an embodiment, a method of forming a battery comprises providing a cathode, providing an anode, disposing a catholyte solution in contact with the cathode, disposing an anolyte solution in contact with the anode, wherein at least one of the catholyte solution or the anolyte solution is gelled, and wherein at least one of the catholyte or the anolyte comprises an organic electrolyte, an ionic liquid electrolyte, or water in salt electrolyte, and disposing a separator between the cathode and the anode.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DESCRIPTION

In this disclosure, the terms "negative electrode" and "anode" are both used to mean "negative electrode." Likewise, the terms "positive electrode" and "cathode" are both used to mean "positive electrode." Reference to an "electrode" alone can refer to the anode, cathode, or both. Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused. As used herein, a "catholyte" refers to an electrolyte solution in contact with the cathode without being in direct contact with the anode, and an "anolyte" refers to an electrolyte solution in contact with the anode without being in direct contact with the cathode. The term electrolyte alone can refer to the catholyte, the anolyte, or an electrolyte in direct contact with both the anode and the cathode.

Batteries are increasingly being used in a wide range of applications as energy storage devices. For incorporating renewable sources of energy into the grid, development of highly energy dense and cheap batteries is considered as being paramount. Energy density and cost are related parameters, where the cost of a system is considered to be feasible if the cost per energy density is very low. Lowering the cost per energy density to a reduced or minimal value entails increasing the energy density, which is depended on the capacity (Ah or mAh/g or mAh/cm$^2$ or mAh/cm$^3$) and voltage (V) of a system. Increasing the capacity can be done through a range of methods. However, increasing the voltage of a one electrolyte system has usually been considered impossible because the voltage is dependent on the electrolyte's thermodynamic properties. For example, aqueous batteries with zinc, iron, aluminum, etc. have usually been considered to be less than a 2V system. This disclosure describes an innovative method of increasing the voltage of any battery system by using a dual electrolyte approach, where one or both electrolytes used are gelled or solidified with improved or optimal ionic transport. The gelling or solidifying of the electrolyte enables the use of relatively cheap or inexpensive separators or membranes rather than expensive separators or membranes, which can stifle a battery's entry into the market. Separating two electrolytes of different pHs or types in the liquid state in a single battery is generally impossible as any mixing can lead to neutralization or unsafe reactions. The use of two electrolytes of differing pHs or types allows access to reactions of the cathodes and anodes at wide electrochemical potential windows. The gelling or solidifying of the electrolyte with a dual electrolyte system is the first such approach to increase the voltage of any battery chemistry.

Standard electrochemical potentials that dictate electrochemical redox reactions at certain reference potentials dictate the overall potential of the battery. The larger the difference between two electrochemical reaction potentials (between the cathode and anode) the higher the overall battery voltage can be. However, these electrochemical reactions take place in different electrolytes or concentrations of electrolytes. Combining two different electrolytes in a single battery has been an extremely difficult challenge and has usually required the use of specialized membranes like ceramic membranes, and ion-exchange separators which are not stable for too long and very expensive (e.g., at a cost of greater than $3000/kg). If two different electrolytes either by type or concentrations can be used in a single battery, then wide electrochemical potential windows can be accessed that can lead to much higher battery potentials, which lead to extremely high energy density.

In this disclosure, we disclose the devices and methods for creating a dual electrolyte system where one part is liquid and the other part is gelled/solid electrolyte, or a dual electrolyte system where both the electrolytes are gelled/solid. The electrolytes used can be of different types such as organic, aqueous, ionic salts, water-in-salt, and the like, and/or the electrolytes can be of different concentrations. Specifically, the electrolytes can be split as a cathode electrolyte (catholyte) and an anode electrolyte (anolyte). Gelling can entail creating a hydrogel or a polymerization reaction that creates an ionic barrier for the other electrolyte to react. This allows us to use very cheap separators or membranes, or in some embodiments no separators at all, that do not stifle the battery's entry into the market. This approach is chemistry agnostic and can be used for a wide range of chemistry's. For example, using this approach zinc, aluminum, magnesium-anode aqueous batteries can reach between 2.4-5V, which is higher or equivalent in voltage compared to the current dominant lithium-ion batteries, but with much higher capacities and thus, higher energy density. This new approach can fit various form factors as well like a cylindrical design (e.g., various types like D cell, AA, AAA, 18650, etc.), pouch cell, coin cell and others. The ease of transformation between form factors can also allow this chemistry to be used in the primary battery industry which is over a billion dollar market. In the rechargeable market, it can be used in grid-based applications, the electric vehicle market, personal electronics market and other new markets where batteries are being designed to be used more frequently.

Figure 1:
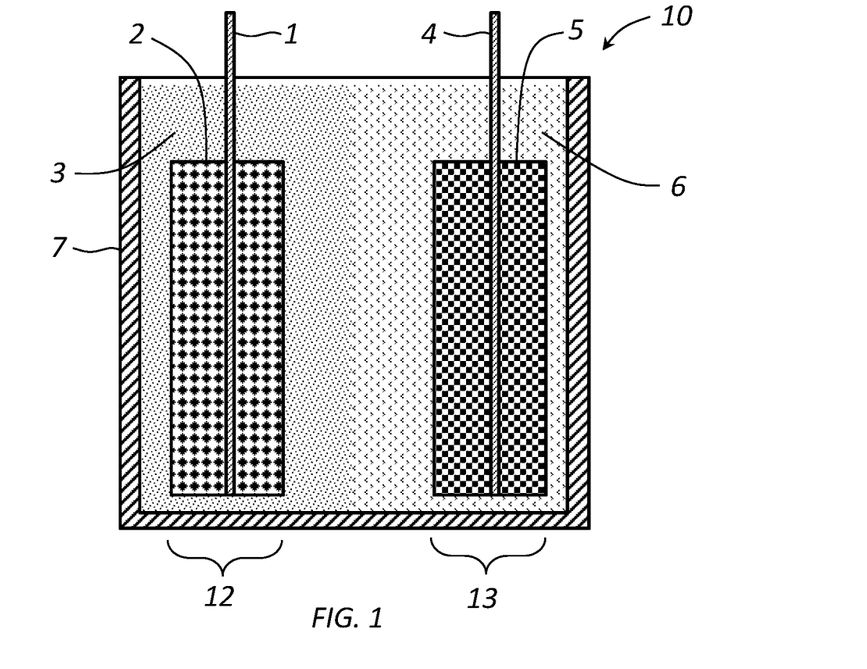
FIG. 1 illustrates a schematic representation of a battery according to an embodiment.
Figure 2:
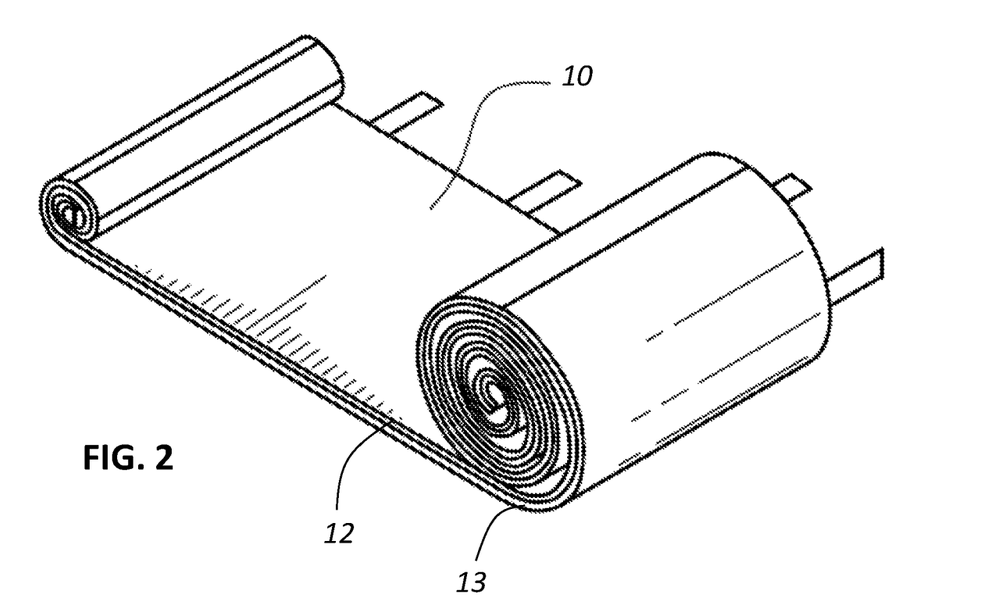
FIG. 2 illustrates a perspective view of a cylindrical battery according to an embodiment.

Referring to FIG. 1, a battery 10 can have a housing 7, a cathode 12, which can include a cathode current collector 1 and a cathode material 2, and an anode 13. In some embodiments, the anode 13 can comprise an anode current collector 4, and an anode material 5. It is noted that the scale of the components in FIG. 1 may not be exact as the features are illustrates to clearly show the electrolyte around the anode 13 and the cathode 12. FIG. 1 shows a prismatic battery arrangement having a single anode 13 and cathode 12. In another embodiment, the battery can be a cylindrical battery (e.g., as shown in FIG. 2) having the electrodes arranged concentrically or in a rolled configuration in which the anode and cathode are layered and then rolled to form a jelly roll configuration. The cathode current collector 1 and cathode material 2 are collectively called either the cathode 12 or the positive electrode 12, as shown in FIG. 2. Similarly, the anode material 5 with the optional anode current collector 4 can be collectively called either the anode 13 or the negative electrode 13. An electrolyte (e.g., an anolyte or catholyte) can be in contact with the cathode 12 and the anode 13. As described in more detail herein, the electrolyte in contact with both the cathode 12 and the anode can be the same with different concentrations, or alternatively, different electrolyte compositions can be used with the anode 13 and the cathode 12 to modify the properties of the battery 10 in some embodiments.

In some embodiments, the battery 10 can comprise one or more cathodes 12 and one or more anodes 13, which can be present in any configuration or form factor. When a plurality of anodes 13 and/or a plurality of cathodes 12 are present, the electrodes can be configured in a layered configuration such that the electrodes alternate (e.g., anode, cathode, anode, etc.). Any number of anodes 13 and/or cathodes 12 can be present to provide a desired capacity and/or output voltage. In the jellyroll configuration (e.g., as shown in FIG. 2), the battery 10 may only have one cathode 12 and one anode 13 in a rolled configuration such that a cross section of the battery 10 includes a layered configuration of alternating electrodes, though a plurality of cathodes 12 and anodes 13 can be used in a layered configuration and rolled to form the rolled configuration with alternating layers.

In an embodiment, housing 7 comprises a molded box or container that is generally non-reactive with respect to the electrolyte solutions in the battery 10, including the catholyte 3 and the anolyte 6. In an embodiment, the housing 7 comprises a polymer (e.g., a polypropylene molded box, an acrylic polymer molded box, etc.), a coated metal, or the like.

The cathode 12 can comprise a mixture of components including an electrochemically active material. Additional components such as a binder, a conductive material, and/or one or more additional components can also be optionally included that can serve to improve the lifespan, rechargeability, and electrochemical properties of the cathode 12. The cathode 12 can comprise a cathode material 2 (e.g., an electroactive material, additives, etc.). Suitable cathode materials 2 can include, but are not limited to, manganese dioxide, copper manganese oxide, hausmannite, manganese oxide, copper intercalated bismuth birnessite, birnessite, todokorite, ramsdellite, pyrolusite, pyrochroite, silver oxide, silver dioxide, silver, nickel oxyhydroxide, nickel hydroxide, nickel, lead oxide, copper oxide, copper dioxide, lead, lead dioxide ($\alpha$ and $\beta$), potassium persulfate, sodium persulfate, ammonium persulfate, potassium permanganate, calcium permanganate, barium permanganate, silver permanganate, ammonium permanganate, peroxide, gold, perchlorate, cobalt oxide ($CoO$, $CoO_2$, $Co_3O_4$), lithium cobalt oxide, sodium cobalt oxide, perchlorate, nickel oxide, bromine, mercury, vanadium oxide, bismuth vanadium oxide, hydroquinone, calix[4]quinone, tetrachlorobenzoquinone, 1,4-naphthoquinone, 9,10-anthraquinone, 1,2-napthaquinone, 9,10-phenanthrenequinone, nitroxide-oxammonium cation redox pair like 2,2,6,6-Tetramethylpiperidin-1-yl) oxyl (TEMPO), carbon, 2,3-dicyano-5,6-dichlorodicyanoquinone, tetracyanoethylene, sulfur trioxide, ozone, oxygen, air, lithium nickel manganese cobalt oxide, sulfur, lithium iron phosphate, lithium copper oxide, lithium copper oxyphosphate, or any combination thereof. In some embodiments, the cathode can comprise an air electrode.

In some embodiments, the cathode material 2 can be based on one or many polymorphs of $MnO_2$, including electrolytic (EMD), $\alpha$-$MnO_2$, $\beta$-$MnO_2$, $\gamma$-$MnO_2$, $\delta$-$MnO_2$, ε-$MnO_2$, or λ-$MnO_2$. Other forms of $MnO_2$ can also be present such as hydrated $MnO_2$, pyrolusite, birnessite, ramsdellite, hollandite, romanechite, todorkite, lithiophorite, chalcophanite, sodium or potassium rich birnessite, cryptomelane, buserite, manganese oxyhydroxide (MnOOH), α-MnOOH, γ-MnOOH, β-MnOOH, manganese hydroxide [$Mn(OH)_2$], partially or fully protonated manganese dioxide, $Mn_3O_4$, $Mn_2O_3$, bixbyite, MnO, lithiated manganese dioxide ($LiMn_2O_4$, $Li_2MnO_3$), $CuMn_2O_4$, aluminum manganese oxide, zinc manganese dioxide, bismuth manganese oxide, copper intercalated birnessite, copper intercalated bismuth birnessite, tin doped manganese oxide, magnesium manganese oxide, or any combination thereof. In general, the cycled form of manganese dioxide in the cathode can have a layered configuration, which in some embodiment can comprise δ-$MnO_2$ that is interchangeably referred to as birnessite. If non-birnessite polymorphic forms of manganese dioxide are used, these can be converted to birnessite in-situ by one or more conditioning cycles as described in more details below. For example, a full or partial discharge to the end of the $MnO_2$ second electron stage (e.g., between about 20% to about 100% of the $2^{nd}$ electron capacity of the cathode) may be performed and subsequently recharging back to its $Mn^{4+}$ state, resulting in birnessite-phase manganese dioxide.

The addition of a conductive additive such as conductive carbon enables high loadings of an electroactive material in the cathode material, resulting in high volumetric and gravimetric energy density. The conductive additive can be present in a concentration between about 1-30 wt %. In some embodiments, the conductive additive can comprise graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof. Higher loadings of the electroactive material in the cathode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), Zenyatta graphite, and/or combinations thereof.

In some embodiments, the conductive additive can have a particle size range from about 1 to about 50 microns, or between about 2 and about 30 microns, or between about 5 and about 15 microns. The total conductive additive mass percentage in the cathode material 2 can range from about 5% to about 99% or between about 10% to about 80%. In some embodiments, the electroactive component in the cathode material 2 can be between 1 and 99 wt. % of the weight of the cathode material 2, and the conductive additive can be between 1 and 99 wt. %.

The cathode material 2 can also comprise a conductive component. The addition of a conductive component such as metal additives to the cathode material 2 may be accomplished by addition of one or more metal powders such as nickel powder to the cathode material 2. The conductive metal component can be present in a concentration of between about 0-30 wt % in the cathode material 2. The conductive metal component may be, for example, nickel, copper, silver, gold, tin, cobalt, antimony, brass, bronze, aluminum, calcium, iron, or platinum. In one embodiment, the conductive metal component is a powder. In some embodiments, the conductive component can be added as an oxide and/or salt. For example, the conductive component can be cobalt oxide, cobalt hydroxide, lead oxide, lead hydroxide, or a combination thereof. In some embodiments, a second conductive metal component is added to act as a supportive conductive backbone for the first and second electron reactions to take place. The second electron reaction has a dissolution-precipitation reaction where $Mn^{3+}$ ions become soluble in the electrolyte and precipitate out on the materials such as graphite resulting in an electrochemical reaction and the formation of manganese hydroxide [$Mn(OH)_2$] which is non-conductive. This ultimately results in a capacity fade in subsequent cycles. Suitable conductive components that can help to reduce the solubility of the manganese ions include transition metals like Ni, Co, Fe, Ti and metals like Ag, Au, Al, Ca. Oxides and salts of such metals are also suitable. Transition metals like Co can also help in reducing the solubility of $Mn^{3+}$ ions. Such conductive metal components may be incorporated into the electrode by chemical means or by physical means (e.g. ball milling, mortar/pestle, spex mixture). An example of such an electrode comprises 5-95% birnessite, 5-95% conductive carbon, 0-50% conductive component (e.g., a conductive metal), and 1-10% binder.

In some embodiments, a binder can be used with the cathode material 2. The binder can be present in a concentration of between about 0-10 wt %. In some embodiments, the binder comprises water-soluble cellulose-based hydrogels, which can be used as thickeners and strong binders, and have been cross-linked with good mechanical strength and with conductive polymers. The binder may also be a cellulose film sold as cellophane. The binders can be made by physically cross-linking the water-soluble cellulose-based hydrogels with a polymer through repeated cooling and thawing cycles. In some embodiments, the binder can comprise a 0-10 wt. % carboxymethyl cellulose (CMC) solution cross-linked with 0-10 wt. % polyvinyl alcohol (PVA) on an equal volume basis. The binder, compared to the traditionally-used PTFE, shows superior performance. PTFE is a very resistive material, but its use in the industry has been widespread due to its good rollable properties. This, however, does not rule out using PTFE as a binder. Mixtures of PTFE with the aqueous binder and some conductive carbon can be used to create rollable binders. Using the aqueous-based binder can help in achieving a significant fraction of the two electron capacity with minimal capacity loss over many cycles. In some embodiments, the binder can be water-based, have superior water retention capabilities, adhesion properties, and help to maintain the conductivity relative to an identical cathode using a PTFE binder instead. Examples of suitable water based hydrogels can include, but are not limited to, methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose, hydroxyethyl cellulose (HEC), and combinations thereof. Examples of crosslinking polymers include polyvinyl alcohol, polyvinylacetate, polyaniline, polyvinylpyrrolidone, polyvinylidene fluoride, polypyrrole, and combinations thereof. In some embodiments, a 0-10 wt % solution of water-cased cellulose hydrogen can be cross linked with a 0-10% wt solution of crosslinking polymers by, for example, repeated freeze/thaw cycles, radiation treatment, and/or chemical agents (e.g. epichlorohydrin). The aqueous binder may be mixed with 0-5% PTFE to improve manufacturability.

The cathode material 2 can also comprise additional elements. The additional elements can be included in the cathode material including a bismuth compound and/or copper/copper compounds, which together allow improved galvanostatic battery cycling of the cathode. When present as birnessite, the copper and/or bismuth can be incorporated into the layered nanostructure of the birnessite. The resulting birnessite cathode material can exhibit improved cycling and long term performance with the copper and bismuth incorporated into the crystal and nanostructure of the birnessite.

The bismuth compound can be incorporated into the cathode 12 as an inorganic or organic salt of bismuth (oxidation states 5, 4, 3, 2, or 1), as a bismuth oxide, or as bismuth metal (i.e. elemental bismuth). The bismuth compound can be present in the cathode material at a concentration between about 1-20 wt % of the weight of the cathode material 2. Examples of bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenyl-bismuth, and/or combinations thereof.

The copper compound can be incorporated into the cathode 12 as an organic or inorganic salt of copper (oxidation states 1, 2, 3, or 4), as a copper oxide, or as copper metal (i.e., elemental copper). The copper compound can be present in a concentration between about 1-70 wt % of the weight of the cathode material 2. In some embodiments, the copper compound is present in a concentration between about 5-50 wt % of the weight of the cathode material 2. In other embodiments, the copper compound is present in a concentration between about 10-50 wt % of the weight of the cathode material 2. In yet other embodiments, the copper compound is present in a concentration between about 5-20 wt % of the weight of the cathode material 2. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which cannot withstand galvanostatic cycling as well.

The cathodes 12 can be produced using methods implementable in large-scale manufacturing. For a $MnO_2$ cathode, the cathode 12 can be capable of delivering the full second electron capacity of the $MnO_2$. In some embodiments, the cathode material 2 can comprises 2-30% wt conductive carbon, 0-30% conductive metal additive, 1-70% wt. copper compound, 1-20% wt bismuth compound, 0-10 wt % binder and birnessite or EMD. In another embodiment the cathode material comprises 2-30 wt % conductive carbon, 0-30% conductive metal additive, 1-20% wt bismuth compound, 0-10 wt % binder and birnessite or EMD. In one embodiment, the cathode material consists essentially of 2-30 wt % conductive carbon, 0-30% conductive metal additive, 1-70% wt. copper compound, 1-20 wt % bismuth compound, 0-10% wt binder and the balance birnessite or EMD. In another embodiment the cathode material consists essentially of 2-30 wt % conductive carbon, 0-30% conductive metal additive, 1-20% wt bismuth compound, 0-10 wt % binder and the balance birnessite or EMD.

The resulting cathode may have a porosity in the range of 20%-85% as determined by mercury infiltration porosimetry. The porosity can be measured according to ASTM D4284-12 "Standard Test Method for Determining Pore Volume Distribution of Catalysts and Catalyst Carriers by Mercury Intrusion Porosimetry" using the version as of the date of the filing of this application.

The cathode material 2 can be formed on a cathode current collector 1 formed from a conductive material that serves as an electrical connection between the cathode material and an external electrical connection or connections. In some embodiments, the cathode current collector 1 can be, for example, carbon, lead, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, bismuth, titanium, half nickel and half copper, or any combination thereof. In some embodiments, the current collector 1 can comprise a carbon felt or conductive polymer mesh. The cathode current collector may be formed into a mesh (e.g., an expanded mesh, woven mesh, etc.), perforated metal, foam, foil, felt, fibrous architecture, porous block architecture, perforated foil, wire screen, a wrapped assembly, or any combination thereof. In some embodiments, the current collector can be formed into or form a part of a pocket assembly, where the pocket can hold the cathode material 2 within the current collector 1. A tab (e.g., a portion of the cathode current collector 1 extending outside of the cathode material 2 as shown at the top of the cathode 12 in FIG. 1) can be coupled to the current collector to provide an electrical connection between an external source and the current collector.

The cathode material 2 can be pressed onto the cathode current collector 1 to form the cathode 12. For example, the cathode material 2 can be adhered to the cathode current collector 1 by pressing at, for example, a pressure between 1,000 psi and 20,000 psi (between $6.9 \times 10^6$ and $1.4 \times 10^8$ Pascals). The cathode material 2 may be adhered to the cathode current collector 1 as a paste. The resulting cathode 12 can have a thickness of between about 0.1 mm to about 5 mm.

The use of the dual electrolytes as described herein can allow for a variety of anode materials to be used. In some embodiments, the anode can comprise lithium, zinc, aluminum, magnesium, iron, calcium, strontium, lanthanum, potassium, sodium, zirconium, titanium, titanium oxide, indium, indium oxide, indium hydroxide, zinc oxide, $Mn_3O_4$, hetaerolite ($ZnMn_2O_4$), vanadium, tin, tin oxide, barium hydroxide, barium, cesium, aluminum hydroxide, copper, bismuth, silicon, carbon and a mixture of any of these materials. The cells as described herein can be formed by pairing of any of the cathode materials described herein and any of the anode materials as described to the extent that the materials mentioned above to generate a voltage in the presence of suitable electrolytes (e.g., a suitable anolyte and catholyte, etc.).

In some embodiments, the anode material 5 can comprise zinc, which can be present as elemental zinc and/or zinc oxide. In some embodiments, the Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material. Additional elements that can be in the anode in addition to the zinc or in place of the zinc include, but are not limited to, lithium, aluminum, magnesium, iron, cadmium and a combination thereof, where each element can be present in amounts that are the same or similar to that of the zinc described herein.

In some embodiments, the anode material 5 can comprise zinc oxide (ZnO), which may be present in an amount of from about 5 wt. % to about 20 wt. %, alternatively from about 5 wt. % to about 15 wt. %, or alternatively from about 5 wt. % to about 10 wt. %, based on the total weight of anode material. As will be appreciated by one of skill in the art, and with the help of this disclosure, the purpose of the ZnO in the anode mixture is to provide a source of Zn during the recharging steps, and the zinc present can be converted between zinc and zinc oxide during charging and discharging phases.

In an embodiment, an electrically conductive material may be optionally present in the anode material in an amount of from about 5 wt. % to about 20 wt. %, alternatively from about 5 wt. % to about 15 wt. %, or alternatively from about 5 wt. % to about 10 wt. %, based on the total weight of the anode material. As will be appreciated by one of skill in the art, and with the help of this disclosure, the electrically conductive material can be used in the anode mixture as a conducting agent, e.g., to enhance the overall electric conductivity of the anode mixture. Non-limiting examples of electrically conductive material suitable for use can include any of the conductive carbons described herein such as carbon, graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the cathode material including, but not limited to, acetylene black, single walled carbon nanotubes, multi-walled carbon nanotubes, graphene, graphyne, or any combinations thereof.

The anode material 5 may also comprise a binder. Generally, a binder functions to hold the electroactive material particles together and in contact with the current collector. The binder can be present in a concentration of 0-10 wt %. The binders may comprise water-soluble cellulose-based hydrogels like methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC), which were used as thickeners and strong binders, and have been cross-linked with good mechanical strength and with conductive polymers like polyvinyl alcohol, polyvinylacetate, polyaniline, polyvinylpyrrolidone, polyvinylidene fluoride and polypyrrole. The binder may also be a cellulose film sold as cellophane. The binder may also be PTFE, which is a very resistive material, but its use in the industry has been widespread due to its good rollable properties. In some embodiments, the binder may be present in anode material in an amount of from about 2 wt. % to about 10 wt. %, alternatively from about 2 wt. % to about 7 wt. %, or alternatively from about 4 wt. % to about 6 wt. %, based on the total weight of the anode material.

In some embodiments, the anode material 5 can be used by itself without a separate anode current collector 4, though a tab or other electrical connection can still be provided to the anode material 5. In this embodiment, the anode material may have the form or architecture of a foil, a mesh, a perforated layer, a foam, a felt, or a powder. For example, the anode can comprise a metal foil electrode, a mesh electrode, or a perforated metal foil electrode.

In some embodiments, the anode 13 can comprise an optional anode current collector 4. The anode current collector 4 can be used with an anode 13, including any of those described with respect to the cathode 12. The anode material 5 can be pressed onto the anode current collector 4 to form the anode 13. For example, the anode material 5 can be adhered to the anode current collector 4 by pressing at, for example, a pressure between 1,000 psi and 20,000 psi (between $6.9 \times 10^6$ and $1.4 \times 10^8$ Pascals). The anode material 5 may be adhered to the anode current collector 4 as a paste. A tab of the anode current collector 4, when present, can extend outside of the device to form the current collector tab. The resulting anode 13 can have a thickness of between about 0.1 mm to about 5 mm.

As shown in FIG. 1, the battery 10 may not comprise a separator. The ability to form the battery 10 without a separator may allow for the overall cost of the battery to be reduced while having the same or similar performance to a battery with a separator. The use of the PGE can serve the function of the separator by forming a physical barrier between the anode 13 and the cathode 12 to prevent short circuiting.

Figure 3:
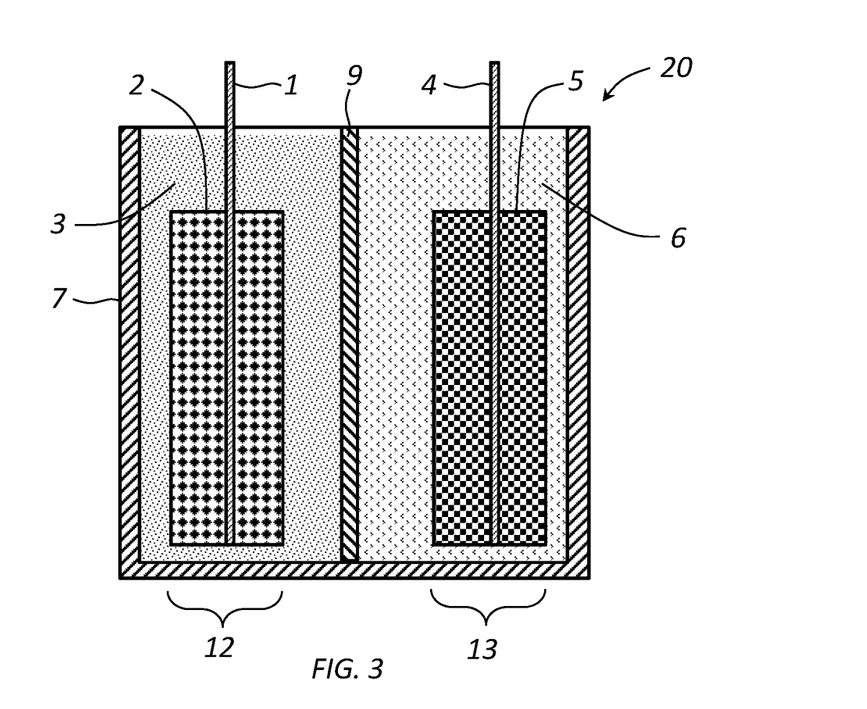
FIG. 3 illustrates another schematic representation of a battery according to an embodiment.

In some embodiments, a separator can be disposed between the anode 13 and the cathode 12 when the electrodes are constructed into the battery. FIG. 3 illustrates an embodiment of a battery 20 that is similar to the battery 10 with the exception that the battery 20 can have a separator 9 disposed between the cathode 12 and the anode 13. The remaining portions of the battery 20 can be the same as those described with respect to the battery 10 of FIG. 1. While shown as being disposed between the anode 13 and the cathode 12, the separator 9 can be used to wrap one or more of the anode 13 and/or the cathode 12, or alternatively one or more anodes 13 and/or cathodes 12 when multiple anodes 13 and cathodes 12 are present.

The separator 9 may comprise one or more layers. For example, when the separator is used, between 1 to 5 layers of the separator can be applied between adjacent electrodes. The separator can be formed from a suitable material such as nylon, polyester, polyethylene, polypropylene, poly(tetrafluoroethylene) (PTFE), poly(vinyl chloride) (PVC), polyvinyl alcohol, cellulose, or any combination thereof. Suitable layers and separator forms can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified" refers to a material whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. In some embodiments, the separator 9 can comprise a CELGARD® brand microporous separator. In an embodiment, the separator 9 can comprise a FS 2192 SG membrane, which is a polyolefin nonwoven membrane commercially available from Freudenberg, Germany. In some embodiments, the separator can comprise a lithium super ionic conductor (LISICON®), sodium super ionic conductions (NASICON), NAFION®, a bipolar membrane, water electrolysis membrane, a composite of polyvinyl alcohol and graphene oxide, polyvinyl alcohol, crosslinked polyvinyl alcohol, or a combination thereof.

While the separator 9 can comprise a variety of materials, the use of a PGE for the electrolyte can allow for a relatively inexpensive separator 9 to be used when one or more separators are present. For example, the separator 9 can comprise CELLOPHANE®, polyvinyl alcohol, CELGARD®, a composite of polyvinyl alcohol and graphene oxide, crosslinked polyvinyl alcohol, PELLON®, and/or a composite of carbon-polyvinyl alcohol. Use of the separator 9 may help in improving the cycle life of the battery 20, but is not necessary in all embodiments.

As shown in FIGS. 1 and 2, a catholyte 3 can be in contact with the cathode 12, and an anolyte 6 can be in contact with the anode 13. As described in more detail herein, the catholyte 3 and/or the anolyte 6 can be polymerized or gelled to form separate gelled electrolytes to prevent mixing between the two electrolyte solutions. The catholyte 3 can be disposed in the housing 10 in contact with the cathode material 2 and the anolyte 6. In the embodiment shown in FIG. 1, the anolyte 6 can be polymerized or gelled, and the catholyte 3 can be a liquid. The polymerization of the anolyte 6 can prevent mixing between the catholyte 3 and the anolyte 6 even when the catholyte 3 is a liquid. In some embodiments, both the catholyte 3 and the anolyte 6 are gelled.

The catholyte 3 can be an acidic or neutral solution, and the pH of the catholyte can be between −1.2 and 7. The catholyte can be used in conditions having temperatures ranging between 0 and 200° C. In some embodiments, the catholyte can comprise an acid such as a mineral acid (e.g., hydrochloric acid, nitric acid, sulfuric acid, etc.). For acid catholyte compositions, the acid concentration can be between about 0 M and about 16 M. In some embodiments, the catholyte solution can comprise a solution comprising potassium permanganate, sodium permanganate, lithium permanganate, calcium permanganate, manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, magnesium sulfate, ammonium chloride, ammonium sulfate, ammonium hydroxide, zinc sulfate, zinc triflate, zinc acetate, zinc nitrate, bismuth chloride, bismuth nitrate, nitric acid, sulfuric acid, hydrochloric acid, sodium sulfate, potassium sulfate, cobalt sulfate, lead sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrate, lithium nitrite, lithium hydroxide, lithium perchlorate, lithium oxalate, lithium fluoride, lithium carbonate, lithium sulfate, lithium bromate, polyvinyl alcohol, carboxymethyl cellulose, xanthum gum, carrageenan, acrylamide, potassium persulfate, sodium persulfate, ammonium persulfate, N,N'-Methylenebisacrylamide, or any combination thereof. For example, the catholyte solution can comprise manganese sulfate mixed with sulfuric acid or potassium permanganate mixed with sulfuric acid. Other dopants to this solution can be zinc sulfate, lead sulfate, titanium disulfide, titanium sulfate hydrate, silver sulfate, cobalt sulfate, and nickel sulfate. In some embodiments, the catholyte solution can comprise manganese sulfate, ammonium chloride, ammonium sulfate, manganese acetate, potassium permanganate, and/or a salt of permanganate, where the additives can have a concentration between 0 and 10M. Depending on the type of manganese salts used voltage of the battery system can be different. For example, in manganese sulfate electrolyte the voltage of the SS-HiVAB is around 2.45-2.5V, while in potassium permanganate electrolyte the voltage of the SS-HiVAB is around 2.8-2.9V.

In some embodiments, the catholyte can comprise a permanganate. Permanganates have a high positive potential. This can allow the overall cell potential to be increased within the battery 10. When present, the permanganate can be present in a molar ratio of an acid (e.g., a mineral acid such a hydrochloric acid, sulfuric acid, etc.) to permanganate of between about 5:1 to about 1:5, or about 1:1 to about 1:6, or between about 1:2 to about 1:4, or about 1:3, though the exact amount can vary based on the expected operation conditions of the battery 10. The concentration of the permanganate (e.g., potassium permanganate or a salt of permanganate, etc.) can be greater than 0 and less than or equal to 5 M. In some embodiments, the catholyte solution comprises sulfuric acid, hydrochloric acid or nitric acid at a concentration greater than 0 and less than or equal to 16M. The use of a permanganate can be advantageous for creating a high voltage battery such that when the use of a catholyte with permanganates is combined with a very negative anode potential, the resulting batter can have an voltage of approximately 2.8V when the cathode and anode are $MnO_2|Zn$ and a voltage of approximately 4V when the cathode and anode are $MnO_2|Al$. When the catholyte comprises a permanganate, suitable permanganates can include, but are not limited to, potassium permanganate, sodium permanganate, lithium permanganate, calcium permanganate, and combinations thereof.

In some embodiments, the anolyte 6 can be an alkaline electrolyte, while the catholyte can be an acidic or neutral solution. The alkaline electrolyte in the anolyte can be a hydroxide such as potassium hydroxide, sodium hydroxide, lithium hydroxide, ammonium hydroxide, cesium hydroxide, or any combination thereof. The resulting anolyte can have a pH greater than 7. In some embodiments, the pH of the anolyte can be greater than or equal to 10 and less than or equal to about 15.13. As described herein, the anolyte can be polymerized or gelled. The resulting anolyte can be in a semi-solid state that resists flowing within the battery. This can serve to limit or prevent any mixing between the anolyte and the catholyte. The anolyte can be polymerized using any suitable techniques, including any of those described herein. Usually a higher concentration of alkaline electrolyte is used to increase the solubility of any metals in the gelled state. For example, the higher concentration can be between 25-70 wt. % of the anolyte.

In addition to a hydroxide, the anolyte can comprise additional components. In some embodiments, the alkaline electrolyte can have zinc oxide, potassium carbonate, potassium iodide and potassium fluoride as additives. When zinc compounds are present in the anolyte, the anolyte can comprise zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, acrylic acid, N,N'-Methylenebisacrylamide, potassium persulfate, ammonium persulfate, sodium persulfate, or a combination thereof.

In some embodiments, an organic solvent containing a suitable salt can be used as an electrolyte. Examples of suitable organic solvents include, but are not limited to, cyclic carbonates, linear carbonates, dialkyl carbonates, aliphatic carboxylate esters, γ-lactones, linear ethers, cyclic ethers, aprotic organic solvents, fluorinated carboxylate esters, and combinations thereof. Any suitable additives including salts as described herein can be used with the organic solvents to form an organic electrolyte for the anolyte and/or catholyte.

In some embodiments, an ionic liquid can be used to form a gelled electrolyte (e.g., a gelled anolyte, a gelled catholyte, etc.). The ionic liquids can comprise 1-ethyl-3-methylimidazolium chloride (EMImCl), 1-allyl-3-methylimidazolium bromixde, 1-allyl-3-methylimidazolium chloride, 1-butyl-2,3-dimethylimidazolium chloride, 1-ethyl-3-methylimidazolium acetate, 1-ethyl-3-methylimidazolium bromide, 1-ethyl-3-methylimidazolium tetrachloroaluminate, lithium hexafluorophosphate ($LiPF_6$), lithium perchlorate, lithium bis(trifluoromethanesulfonyl)imide, lithium bis(oxalato)borate, and combinations thereof. Other ionic liquids are known and can also be used. In some embodiments, EMImCl can be used as the ionic liquid and can be purified before mixing with an aluminum salt to form an aluminum-ion conducting electrolytes. The aluminum salt can be aluminum chloride, aluminum acetate, aluminum nitrate, aluminum bromide and others. The mixture of EMImCl with aluminum chloride can be made by slowly adding a precise amount of aluminum chloride in an inert atmosphere. The mixing ratio of aluminum chloride with EMImCl can be between 5:1 to 1:1, or about 1.5:1.

In some embodiments, a water in salt electrolyte can be gelled and used as the catholyte and/or anolyte. A water in salt electrolyte can include an electrolyte in which the salt concentration is above the saturation point. The activity of water in an aqueous electrolyte can be further reduced by increasing the salt concentration above the saturation point in order to form a water in salt electrolyte. The ionic conductivity of such electrolytes can be higher than those in a regular aqueous electrolyte. A water in salt electrolyte can comprise water along with a suitable salt above its saturation point, including any of the salts and additives described herein with regard to the aqueous anolyte and/or catholyte.

The polymerization process can be performed with any electrolyte, including any of those described herein (e.g., organic, aqueous, ionic liquid, water in salt, etc.). A number of polymerization techniques can be used to form the gelled/solid electrolyte—for example, step-growth, chain-growth, emulsion polymerization, solution polymerization, suspension polymerization, precipitation polymerization, photopolymerization and others. Once the gelled/solid electrolytes are formed through the polymerization step, they can combined in a single battery housing as described herein. The battery can use separators or be membrane-less or separator-less. In embodiments for extended long cycle cycling capabilities, a separator can be used between the two electrolytes such as the relatively inexpensive separators as described herein.

As described herein, the electrolyte can be polymerized or gelled to form a polymer gel electrolyte (PGE) for the catholyte and/or the anolyte. The resulting PGE can be in a semi-solid state that resists flowing within the battery. For example, the PGE can comprise an inert hydrophilic polymer matrix impregnated with aqueous electrolyte. The electrolyte can be polymerized using any suitable techniques. In an embodiment, a method of forming a PGE can begin with selecting a monomer material for the PGE. The monomer can be polar vinyl monomer selected from the group consisting of acrylic acid, vinyl acetate, acrylate esters, vinyl isocyanate, acrylonitrile, or any combinations thereof. The aqueous electrolyte component can then be selected, and can include any of the components described above with respect to the electrolyte. An initiator can be added to start the polymerization process. In some embodiments, a cross-linker can be used in the electrolyte composition to further cross-link the polymer matrix in order to form the PGE. The monomer in the composition (e.g., a polar vinyl monomer) can be present in an amount of between about 5% to about 50% by weight, the initiator can be present in an amount of between about 0.001 wt. % to about 0.1 wt. %, and the cross-linker can be present in an amount of between 0 to 5 wt. %.

In some embodiments, the PGE can be formed in-situ, which refers to the introduction of the electrolyte as a liquid into the housing followed by subsequent polymerization to form the PGE within the housing. This method can allow the electrolyte composition to soak into the void spaces, the anode, and/or the cathode prior to fully polymerizing to form the PGE. In some embodiments, a vacuum (e.g., a pressure less than atmospheric pressure) can be created within the housing 7 upon introduction of the electrolyte into the corresponding compartment. The vacuum can serve to remove air and allow the electrolyte to penetrate the anode 13, the cathode 12, and/or the various void spaces within the battery 10. In some embodiments, the vacuum can be between about 10 and 29.9 inches of mercury or between about 20 and about 29.9 inches of mercury vacuum. The use of the vacuum can help to avoid the presence of air pockets within the battery 10 prior to the full polymerization of the electrolyte. In some embodiments, the electrodes can be soaked in the electrolyte solution for between 1-120 minutes at a temperature of between 0° C. to 30° C. prior to full polymerization of the electrolyte to allow the electrolyte to impregnate the electrodes. Once the electrolyte is polymerized, the battery can be allowed to rest prior to use. In some embodiments, the battery can be allowed to rest for between 5 minutes and 24 hours.

In order to help impregnate the electrodes with the electrolyte, the electrodes can be pre-soaked with the selected electrolyte solution prior to polymerizing the electrolyte. This can be performed by soaking the electrodes in the electrolyte (e.g., in a catholyte or anolyte separately) outside of the battery or housing, and then placing the pre-soaked electrodes into the housing to construct the battery. In some embodiments, an electrolyte that does not contain a polymer or gelling agent can be introduced into the battery to soak the electrodes in-situ. This can include the use of a vacuum to assist in impregnating the electrodes. The electrodes can be soaked for between about 1 minute and 24 hours. In some embodiments, the soaking can be carried out over a plurality of cycles in which the battery is filled with the electrolyte and allowed to soak, drained, refilled and allowed to soak, followed by draining a desired number of times. Once the electrodes are soaked and impregnated with the electrolyte, the electrolyte containing the polymer and polymerization agents (e.g., an initiator, cross-linking agent, etc.) can be introduced into the housing and allowed to polymerize to form the final battery.

The composition of the electrolyte, the monomer material, the initiator, and the conditions of the formation (e.g., temperature, etc.) can be selected to provide a desired polymerization time to allow the electrolyte composition to properly soak the components of the batter to absorb and penetrate into the electrodes. The temperature can be controlled to control the polymerization process, where colder temperatures can inhibit or slow the polymerization, and warmer temperatures can decrease the polymerization time or accelerate the polymerization process. In addition, an increase in an alkaline electrolyte component (e.g., a hydroxide) can decrease the polymerization time, and an increase in the initiator concentration will decrease the polymerization time. Suitable polymerization times can be between 1 minute and 24 hours, based on the composition of the electrolyte solution and the temperature of the reaction.

As an example of a polymerization process, a mixture of acrylic acid, N, N'-methylenebisacrylamide, and alkaline solution can be created at a temperature of around 0° C. Any additives can then be added to the solution (e.g., gassing inhibitors, additional additives as described herein, etc.). For example, zinc oxide, when used in the electrolyte, can be dissolved in the alkaline solution after mixing the precursor components, where the zinc oxide can beneficial during the electrochemical cycling of the anode. To polymerize the resulting mixture an initiator such as potassium persulfate can be added to initiate the polymerization process and form a solid or semi-solid polymerized electrolyte (e.g., a PGE). The resulting polymerized electrolyte can be stable over time once the polymerization process has occurred.

The polymerization process can occur prior to the construction of the battery 10 or after the cell is constructed. In some embodiments, the electrolyte can be polymerized and placed into a tray to form a sheet. Once polymerized, the sheet can be cut into a suitable size and shape and one or more layers can be used to form the electrolyte in contact with the anode 13. When a pre-formed PGE is used, additional liquid electrolyte can be introduced into the battery and/or the electrodes can be pre-soaked with the electrolyte prior to constructing the battery.

In some embodiments, the PGE can be formed using an aqueous electrolyte, organic electrolyte, ionic liquid, water in salt electrolyte, and the like. In some embodiments, an aqueous electrolyte can be used for the catholyte and/or anolyte and gelled to form an aqueous hydrogel as the PGE. In some embodiments, aqueous hydrogels can be made through a free radical polymerization process. For example, acrylic acid (AA) can be selected as the monomer with N,N'-methylenebisacrylamide (MBA) as the cross-linker and potassium persulfate as the initiator. In aqueous alkaline batteries, a suitable hydroxide (e.g., potassium hydroxide (KOH), sodium hydroxide, lithium hydroxide, etc.) can be used to form the electrolyte. The hydroxide can be encapsulated in a hydrogel network by neutralizing the hydroxide with the AA. To create a hydrogel, the monomer can be combined with any cross-linker until the cross-linker is dissolved. Separately, an amount of the hydroxide can be cooled to slow the reaction. In some embodiments in which the electrolyte is an aqueous electrolyte, the hydroxide can be cooled to a temperature below about 10° C., below about 5° C. or below about 0° C. The mixed solution of the monomer and any cross-linker can then added drop-wise to the chilled solution of the hydroxide as the neutralization reaction releases heat. To gel the resulting mixture of the hydroxide, monomer, and cross-linker, an initiator such as potassium persulfate can be added. The mixture can then be allowed to form a PGE. The amounts and concentrations of the ingredients can be varied to obtain varying mechanical strengths of the hydrogels.

Electrolytes comprising ionic liquids can also be used to form PGEs, including any of the ionic liquid described herein. To form a PGE using an ionic liquid, a solution of any additives, which can be in a suitable solvent, can be prepared and a monomer can be added. The monomer can be any suitable monomer. For example, acrylamide can be used as a polymerization agent for ionic liquids. To this solution, the ionic liquid along with the additive solution can be mixed along with an initiator. Any suitable initiator for use with the polymerization agent can be used. For example, azobisisobutyronitrile can be used with acrylamide. The initiator can be added in a suitable amount such about 1 wt. % of the polymerization agent. This final solution can then be heated heated to form a polymerized gel.

Organic electrolytes comprising a salt dissolved in an organic solvent can also be gelled to form an anolyte and/or catholyte. As an example, lithium-ion conducting electrolytes can be gelled using a number of polymerization techniques such as ring-opening polymerization, photo-initiated radical polymerization, UV-initiated radical polymerization, thermal-initiated polymerization, in-situ polymerization, UV-irradiation, electrospinning, and others. The lithium electrolyte can comprise lithium hexafluorophosphate ($LiPF_6$), lithium perchlorate, lithium bis(trifluoromethanesulfonyl)imide, lithium bis(oxalato)borate, and combinations thereof in an organic solvent such as ethylene carbonate, dimethyl carbonate, propylene carbonate, diethyl carbonate, ethyl methyl carbonate, and combinations thereof. An exemplary mixture can include 1M $LiPF_6$ mixed in a solvent mixture of ethylene carbonate and dimethyl carbonate. Other solvents also exist that can be used as a mixture to reduce the flammability of the organic electrolyte.

The organic electrolyte can be gelled by mixing the selected salts with the organic solvent. A gelling agent can then be added along with an initiator. The gelling agent can be added in an amount between about 0.1 to about 5 wt. % of the mixture, and the initiator can be added in an amount of between about 0.01 to about 1 wt % of the mixture. In some embodiments, a suitable gelling agent for an organic electrolyte can comprise pentaerythritol tetraacrylate and the initiator can comprise azodiisobutyronitrile. The resulting mixture can be gelled (e.g., polymerized) by heating the mixture to about 50-90° C., or to about 70° C. and holding for 1-24 hours.

For an aqueous electrolyte which is acidic or neutral in nature, the polymerization can carried out using a number of processes. In an embodiment, a method for making a solid state gelled aqueous acid or neutral electrolyte can comprise the addition of acrylamide to a solution comprising manganese sulfate, $H_2SO_4$, ammonium sulfate, potassium permanganate, and/or sulfuric acid. A gelling agent comprising acrylamide can be added to the solution and mixed at a temperature between about 70-90° C. for at least an hour until the solution is homogenous. After the solution is mixed well then a cross-linker and initiator can be added to the solution and mixed between 2-48 hrs. until the solution gels.

Having described the processes for forming PGEs general, specific examples are provided below.

Gelled electrolytes of aqueous, organic and other types can be made by a wide range of techniques. In some aspects, aqueous hydrogels can be made through a free radical polymerization process. Acrylic acid (AA) can be used the monomer, with N,N'-methylenebisacrylamide (MBA) as the cross-linker, and potassium persulfate as the initiator. In aqueous alkaline batteries, potassium hydroxide (KOH) is usually the electrolyte. However, sodium hydroxide and lithium hydroxide can also be used as a substitute. KOH can be encapsulated in a hydrogel network by neutralizing the hydroxide with the AA. To create a hydrogel, around 0.1 g of MBA can be mixed with 20 ml of AA until all of the MBA is dissolved. Separately, around 100 ml of 45 wt. % KOH can be chilled to 0° C. The mixed solution of MBA and AA can then be added drop-wise to the chilled solution of KOH as it releases heat. To gel the mixture of KOH, AA, and MBA, around 2-6 g of 4 wt. % potassium persulfate can be added. The amounts and concentrations of the ingredients can be varied to obtain varying mechanical strengths of the hydrogels.

For aluminum-ion conducting electrolytes, ionic liquids mixed with aluminum chloride electrolytes can be used. The ionic liquids can be 1-ethyl-3-methylimidazolium chloride (EMImCl), 1-allyl-3-methylimidazolium bromixde, 1-allyl-3-methylimidazolium chloride, 1-butyl-2, 3-dimethylimidazolium chloride, 1-ethyl-3-methylimidazolium acetate, 1-ethyl-3-methylimidazolium bromide, 1-ethyl-3-methylimidazolium tetrachloroaluminate and others. Usually EMImCl is used as the ionic liquid and it is purified before mixing with an aluminum salt. The aluminum salt can be aluminum chloride, aluminum acetate, aluminum nitrate, aluminum bromide and others. The mixture of EMImCl with aluminum chloride can be made by slowly adding a precise amount of aluminum chloride in an inert atmosphere. The mixing ratio of aluminum chloride with EMImCl can be between 5:1 to 1:1, but usually 1.5:1 is used. To make a polymerized solution of the ionic liquid, a separate solution of aluminum chloride can be cooled in dichloromethane to which equal molar acrylamide can be added slowly while mixing. The solution can be yellow in color. Afterwards to this solution, the EMImCl with aluminum chloride can be added with initiator azobisisobutyronitrile at a concentration which is 1 wt. % of acrylamide. This final solution can then be finally heated at around 60° C. to form a polymerized gel. The entire process can be performed in a glovebox to present any moisture interaction with the ionic-liquid.

For lithium-ion conducting electrolytes, a number of polymerization techniques can be used like ring-opening polymerization, photo-initiated radical polymerization, UV-initiated radical polymerization, thermal-initiated polymerization, in-situ polymerization, UV-irradiation, electrospinning and others. The lithium electrolyte that can used are lithium hexafluorophosphate ($LiPF_6$), lithium perchlorate, lithium bis(trifluoromethanesulfonyl)imide, lithium bis(oxalato)borate and others. The most widely used electrolyte is 1M $LiPF_6$ mixed in an organic solvent mixture of ethylene carbonate and dimethyl carbonate. Sometimes propylene carbonate, diethyl carbonate and ethyl methyl carbonate can also be used. Other solvents also exist that can be used as a mixture to reduce the flammability of the organic electrolyte. For preparing a polymerized gel mixture of the lithium-ion conducting electrolyte, a solution of 1M $LiPF_6$ mixed with ethylene carbonate, diethyl carbonate, and ethyl methyl carbonate (volume ratio:1:1:1) can be mixed with 1.5 wt % pentaerythritol tetraacrylate and 0.1 wt % azodiisobutyronitrile. The in-situ polymerization takes place by heating it at 70° C. for 6 hours.

For an aqueous electrolyte which is acidic or neutral in nature, the polymerization can occur through a number of ways. An example of one such procedure is shown here. The method for making a solid state gelled aqueous acid or neutral electrolyte involves the addition of acrylamide to a mixture of, 1M manganese sulfate or 1M manganese sulfate and $0.5H_2SO_4$ solution or 1M manganese sulfate, 3M ammonium sulfate and $0.5MH_2SO_4$ solution or 0.5M potassium permanganate and 0.5M sulfuric acid solution. If 200 ml of total solution is made then around 50 g of acrylamide is added to the solution and mixed vigorously between 70-90° C. for at least an hour till the solution is homogenous. After the solution is mixed well then between 100-700 mg of N,N'-methylenebisacrylamide and 100 mg-1500 mg of potassium persulfate is added to the solution and mixed between 2-48 hrs till the solution completely gels.

A number of polymerization processes are described herein. These can also be performed with magnesium-ion conducting electrolytes or water-in-salt type electrolytes. The application of these gelled or solid state electrolytes in a single battery with respective cathodes and anodes can lead to much higher voltages and capacities. For example, pairing a manganese dioxide cathode in an aqueous acidic or neutral electrolyte in either liquid or gelled/solid state with zinc or aluminum anode in gelled/solid aqueous alkaline electrolyte can lead to voltages >2.4 to 4V which has never been achieved in an aqueous battery. Pairing two different types of electrolytes and systems can also be achieved. For examples, pairing a manganese dioxide cathode in a gelled/solid aqueous acidic or neutral electrolyte with lithium metal in a gelled/solid organic electrolyte can help achieve voltages >4V with a higher specific capacity of 308 mAh/g which is much better than any Li-ion system currently available in the market. This would also increase the safety of the battery as it is complete solid state and reduces/eliminates dendritic shorts. It is important that at least one electrolyte has to be solid/gelled. A battery design is shown in FIG. 1 where the dual electrolyte concept with a gelled/solid state property is incorporated to obtain much higher voltages.

Having described various systems and methods herein, certain aspect can include, but are not limited to:

In a first aspect, a solid state high voltage battery can comprise: a cathode; an anode; a cathode compartment with a liquid or solid polymerized catholyte solution; an anode compartment with a liquid or solid polymerized anolyte solution; and a separator.

A second aspect can include the battery of the first aspect, wherein the cathode compartment and the anode compartment each contain a current collector made of carbon, lead, copper, nickel, silver, bismuth, titanium, magnesium, aluminum, gold, or a combination thereof.

A third aspect can include the battery of the second aspect, wherein the current collector is a mesh, foil, foam, felt, fibrous, a porous block architecture, or a combination thereof.

A fourth aspect can include the battery of the first aspect, wherein the cathode is manganese oxides ($\delta$-$MnO_2$, $\lambda$-$MnO_2$, $\alpha$-$MnO_2$, $\beta$-$MnO_2$, $\varepsilon$-$MnO_2$, $\gamma$-$MnO_2$, hydrated $MnO_2$, cryptomelane, electrolytic manganese dioxide, MnOOH, $\alpha$-MnOOH, $\beta$-MnOOH, $\gamma$-MnOOH, $Mn(OH)_2$, MnO, $Mn_2O_3$, $Mn_3O_4$), lithium manganese oxide ($LiMn_2O_4$, $Li_2MnO_3$), aluminum manganese oxide, zinc manganese oxide, copper manganese oxide, bismuth manganese oxide, copper intercalated birnessite, copper intercalated bismuth birnessite, tin doped manganese oxide, magnesium manganese oxide, silver oxide, silver dioxide, silver, nickel oxyhydroxide, nickel hydroxide, nickel, lead oxide, copper oxide, copper dioxide, lead, lead dioxide ($\alpha$ and $\beta$), potassium persulfate, sodium persulfate, ammonium persulfate, potassium permanganate, calcium permanganate, barium permanganate, silver permanganate, ammonium permanganate, peroxide, gold, perchlorate, cobalt oxide (CoO, $CoO_2$, $Co_3O_4$), lithium cobalt oxide, sodium cobalt oxide, perchlorate, nickel oxide, bromine, mercury, vanadium oxide, bismuth vanadium oxide, hydroquinone, calix[4]quinone, tetrachlorobenzoquinone, 1,4-naphthoquinone, 9,10-anthraquinone, 1,2-napthaquinone, 9,10-phenanthrenequinone, nitroxide-oxammonium cation redox pair like 2,2, 6,6-Tetramethylpiperidin-1-yl)oxy (TEMPO), carbon, 2,3-dicyano-5,6-dichlorodicyanoquinone, tetracyanoethylene, sulfur trioxide, ozone, oxygen, air, lithium nickel manganese cobalt oxide, sulfur, lithium iron phosphate, lithium copper oxide, lithium copper oxyphosphate, and a mixture of any of these materials.

A fifth aspect can include the battery of the first aspect, wherein the anode is lithium, zinc, aluminum, magnesium, iron, calcium, strontium, lanthanum, potassium, sodium, zirconium, titanium, titanium oxide, indium, indium oxide, indium hydroxide, zinc oxide, $Mn_3O_4$, hetaerolite ($ZnMn_2O_4$), vanadium, tin, tin oxide, barium hydroxide, barium, cesium, aluminum hydroxide, copper, bismuth, silicon, carbon and a mixture of any of these materials.

A sixth aspect can include the battery of the first aspect, wherein the liquid or solid polymerized catholyte solution in the cathode compartment contains a mixed solution comprising potassium permanganate, sodium permanganate, lithium permanganate, calcium permanganate, manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, magnesium sulfate, ammonium chloride, ammonium sulfate, ammonium hydroxide, aluminum chloride, lithium hexafluorophosphate, aluminum bromide, aluminum acetate, ammonium chloride, sulfuric acid, nitric acid, hydrochloric acid, sodium perchlorate, sodium hexafluorophosphate, lithium perchlorate, lithium bis(trifluoromethanesulfonyl)imide, lithium bis(oxalato)borate, zinc sulfate, zinc triflate, zinc acetate, zinc nitrate, bismuth chloride, bismuth nitrate, nitric acid, sulfuric acid, hydrochloric acid, sodium sulfate, potassium sulfate, cobalt sulfate, lead sulfate sodium hydroxide, potassium hydroxide, titanium sulfate, titanium chloride, lithium nitrate, lithium chloride, lithium bromide, lithium bicarbonate, lithium acetate, lithium sulfate, lithium nitrate, lithium nitrite, lithium hydroxide, lithium perchlorate, lithium oxalate, lithium fluoride, lithium carbonate, lithium sulfate, lithium bromate, polyvinyl alcohol, carboxymethyl cellulose, xanthum gum, carrageenan, acrylamide, potassium persulfate, sodium persulfate, ammonium persulfate, N,N'-Methylenebisacrylamide, or a combination thereof.

A seventh aspect can include the battery of the first or sixth aspect, wherein the solid polymerized catholyte solution has a pH between 0 and 7.

An eighth aspect can include the battery of the first, sixth, or seventh aspect, wherein the solid polymerized catholyte solution has a temperature between 0 and 200° C.

A ninth aspect can include the battery of the first, sixth, seventh, or eighth aspect, wherein the solid polymerized catholyte solution is at a concentration between 0 and 10M.

A tenth aspect can include the battery of the first, sixth, seventh, eighth, or ninth aspect, wherein the solid polymerized catholyte solution comprises sulfuric acid, hydrochloric acid or nitric acid at a concentration between 0 and 5M.

An eleventh aspect can include the battery of the first, sixth, ninth, or tenth aspect, wherein the solid polymerized catholyte solution comprises potassium permanganate or a salt of permanganate and an acid, wherein the volumetric ratio of the potassium permanganate or a salt of permanganate to the acid is 5:1 to 1:5.

A twelfth aspect can include the battery of the first, sixth, seventh, eighth, or ninth aspect, wherein the solid polymerized catholyte solution comprises manganese sulfate, ammonium chloride and an acid, wherein the volumetric ratio of the manganese sulfate and ammonium chloride mixture to the acid is 5:1 to 1:5.

A thirteenth aspect can include the battery of the first or fourth aspect, wherein the cathode is mixed with carbon.

A fourteenth aspect can include the battery of the thirteenth aspect, wherein the carbon is graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof.

A fifteenth aspect can include the battery of the first, fourth, thirteenth, or fourteenth aspect, where the cathode active material is between 1 and 99 wt. % and the carbon is between 1 and 99 wt. %.

A sixteenth aspect can include the battery of the first aspect, wherein the liquid or solid polymerized anolyte solution in the anode compartment is a mixed polymerized solution comprising of zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, zinc triflate, aluminum sulfate, iron sulfate, aluminum chloride, iron chloride, magnesium chloride, magnesium sulfate, magnesium perchlorate, aluminum perchlorate, aluminum triflate, aluminum chloride, lithium hexafluorophosphate, aluminum bromide, aluminum acetate, ammonium chloride, sulfuric acid, nitric acid, hydrochloric acid, sodium perchlorate, sodium hexafluorophosphate, lithium perchlorate, lithium bis(trifluoromethanesulfonyl)imide, lithium bis(oxalato)borate, iron triflate, magnesium triflate, 1-methyl-1-propylpyrrolidinium chloride, 1-ethyl-3-methylimidazolium chloride, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, acrylic acid, N,N'-Methylenebisacrylamide, potassium persulfate, ammonium persulfate, sodium persulfate or a combination thereof.

A seventeenth aspect can include the battery of the first or sixteenth aspect, wherein the liquid or solid polymerized anolyte solution has a pH between 7 and 15.13.

An eighteenth aspect can include the battery of the first, sixth, or sixteenth aspect, wherein the solid polymerized catholyte solution and the solid polymerized anolyte solution has a temperature between 0 and 200° C.

A nineteenth aspect can include the battery of the first or fifth aspect, wherein the metallic anode is a foil architecture, a mesh architecture, a perforated architecture, a foam architecture, a felt architecture or a powder architecture.

A twentieth aspect can include the battery of the first aspect, wherein the separator is cellophane, Celgard, LiSiCON, NaSiCON, filter paper, polyvinyl alcohol, crosslinked polyvinyl alcohol or a combination thereof.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

What is claimed is:

1. A solid state high voltage battery comprising:
a cathode;
an anode;
a catholyte solution in contact with the cathode;
an anolyte solution in contact with the anode, wherein at least one of the catholyte solution or the anolyte solution is gelled, wherein at least one of the catholyte solution or the anolyte solution comprises an organic electrolyte, an ionic liquid electrolyte, or water in salt electrolyte, and wherein the gelled catholyte solution or the gelled anolyte solution forms an ionic barrier between the catholyte solution and the anolyte solution, and wherein the catholyte solution is in direct contact with the anolyte solution.

2. The battery of claim 1, wherein the cathode and the anode each comprise a current collector made of carbon, lead, copper, nickel, silver, bismuth, titanium, magnesium, aluminum, gold, or a combination thereof.

3. The battery of claim 2, wherein the cathode current collector is a mesh, foil, foam, felt, fibrous architecture, a porous block architecture, or a combination thereof.

4. The battery of claim 1, wherein the cathode comprises manganese oxides ($\delta$-$MnO_2$, $\lambda$-$MnO_2$, $\alpha$-$MnO_2$, $\beta$-$MnO_2$, $\epsilon$-$MnO_2$, $\gamma$-$MnO_2$, hydrated $MnO_2$, cryptomelane, electrolytic manganese dioxide, MnOOH, $\alpha$-MnOOH, $\beta$-MnOOH, $\gamma$-MnOOH, $Mn(OH)_2$, MnO, $Mn_2O_3$, $Mn_3O_4$), lithium manganese oxide ($LiMn_2O_4$, $Li_2MnO_3$), aluminum manganese oxide, zinc manganese oxide, copper manganese oxide, bismuth manganese oxide, copper intercalated birnessite, copper intercalated bismuth birnessite, tin doped manganese oxide, magnesium manganese oxide, silver oxide, silver dioxide, silver, nickel oxyhydroxide, nickel hydroxide, nickel, lead oxide, copper oxide, copper dioxide, lead, lead dioxide ($\alpha$ and $\beta$), potassium persulfate, sodium persulfate, ammonium persulfate, potassium permanganate, calcium permanganate, barium permanganate, silver permanganate, ammonium permanganate, peroxide, gold, perchlorate, cobalt oxide (CoO, $CoO_2$, $Co_3O_4$), lithium cobalt oxide, sodium cobalt oxide, perchlorate, nickel oxide, bromine, mercury, vanadium oxide, bismuth vanadium oxide, hydroquinone, calix[4]quinone, tetrachlorobenzoquinone, 1,4-naphthoquinone, 9,10-anthraquinone, 1,2-napthaquinone, 9,10-phenanthrenequinone, nitroxide-oxammonium cation redox pair like 2,2,6,6-Tetramethylpiperidin-1-yl)oxyl (TEMPO), carbon, 2,3-dicyano-5,6-dichlorodicyanoquinone, tetracyanoethylene, sulfur trioxide, ozone, oxygen, air, lithium nickel manganese cobalt oxide, sulfur, lithium iron phosphate, lithium copper oxide, lithium copper oxyphosphate, or a mixture thereof.

5. The battery of claim 1, wherein the anode comprises lithium, zinc, aluminum, magnesium, iron, calcium, strontium, lanthanum, potassium, sodium, zirconium, titanium, titanium oxide, indium, indium oxide, indium hydroxide, zinc oxide, $Mn_3O_4$, hetaerolite ($ZnMn_2O_4$), vanadium, tin, tin oxide, barium hydroxide, barium, cesium, aluminum hydroxide, copper, bismuth, silicon, carbon, or a mixture thereof.

6. The battery of claim 1, wherein the catholyte solution comprises a mixed solution comprising potassium permanganate, sodium permanganate, lithium permanganate, calcium permanganate, manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, magnesium sulfate, ammonium chloride, ammonium sulfate, ammonium hydroxide, aluminum chloride, lithium hexafluorophosphate, aluminum bromide, aluminum acetate, ammonium chloride, sulfuric acid, nitric acid, hydrochloric acid, sodium perchlorate, sodium hexafluorophosphate, lithium perchlorate, lithium bis(trifluoromethanesulfonyl)imide, lithium bis(oxalato)borate, zinc sulfate, zinc triflate, zinc acetate, zinc nitrate, bismuth chloride, bismuth nitrate, nitric acid, sulfuric acid, hydrochloric acid, sodium sulfate, potassium sulfate, cobalt sulfate, lead sulfate sodium hydroxide, potassium hydroxide, titanium sulfate, titanium chloride, lithium nitrate, lithium chloride, lithium bromide, lithium bicarbonate, lithium acetate, lithium sulfate, lithium nitrate, lithium nitrite, lithium hydroxide, lithium perchlorate, lithium oxalate, lithium fluoride, lithium carbonate, lithium sulfate, lithium bromate, polyvinyl alcohol, carboxymethyl cellulose, xanthum gum, carrageenan, acrylamide, potassium persulfate, sodium persulfate, ammonium persulfate, N,N'-Methylenebisacrylamide, or any combination thereof.

7. The battery of claim 1, wherein the catholyte solution has a pH between 0 and 7.

8. The battery of claim 1, wherein the catholyte solution is at a concentration between 0 and 10M.

9. The battery of claim 1, wherein the catholyte solution comprises sulfuric acid, hydrochloric acid, or nitric acid at a concentration between 0 and 5M.

10. The battery of claim 1, wherein the catholyte solution comprises potassium permanganate or a salt of permanganate and an acid, wherein a volumetric ratio of the potassium permanganate or salt of permanganate to the acid is 5:1 to 1:5.

11. The battery of claim 1, wherein the catholyte solution comprises a manganese sulfate and ammonium chloride mixture, and an acid, wherein a volumetric ratio of the manganese sulfate and ammonium chloride mixture to the acid is 5:1 to 1:5.

12. The battery of claim 1, wherein the cathode comprises conductive additive, and wherein the conductive additive comprises graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof.

13. The battery of claim 12, where the cathode comprises a cathode active material and the conductive additive, and wherein the cathode active material is between 1 and 99 wt. % and the conductive additive is between 1 and 99 wt. %.

14. The battery of claim 1, wherein the anolyte solution comprises a gelled solution comprising zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, zinc triflate, aluminum sulfate, iron sulfate, aluminum chloride, iron chloride, magnesium chloride, magnesium sulfate, magnesium perchlorate, aluminum perchlorate, aluminum triflate, aluminum chloride, lithium hexafluorophosphate, aluminum bromide, aluminum acetate, ammonium chloride, sulfuric acid, nitric acid, hydrochloric acid, sodium perchlorate, sodium hexafluorophosphate, lithium perchlorate, lithium bis (trifluoromethanesulfonyl) imide, lithium bis (oxalato) borate, iron triflate, magnesium triflate, 1-methyl-1-propylpyrrolidinium chloride, 1-ethyl-3-methylimidazolium chloride, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, acrylic acid, N,N'-Methylenebisacrylamide, potassium persulfate, ammonium persulfate, sodium persulfate, or a combination thereof.

15. The battery of claim 1, wherein the anolyte solution has a pH between 7 and 15.13.

16. The battery of claim 1, wherein the anode has a foil architecture, a mesh architecture, a perforated architecture, a foam architecture, a felt architecture, or a powder architecture.

17. A method of forming a battery, the method comprising:
providing a cathode;
providing an anode;
disposing a catholyte solution in contact with the cathode; and
disposing an anolyte solution in contact with the anode and the catholyte solution, wherein at least one of the catholyte solution or the anolyte solution is gelled, wherein at least one of the catholyte solution or the anolyte solution comprises an organic electrolyte, an ionic liquid electrolyte, or water in salt electrolyte, and wherein the gelled catholyte solution or the gelled anolyte solution forms an ionic barrier between the catholyte solution and the anolyte solution, and wherein the gelled catholyte solution or the catholyte solution is in direct contact with the gelled anolyte or the anolyte solution.

18. The method of claim 17, wherein at least one of the catholyte solution or the anolyte solution comprises an electrolyte solution, wherein the method further comprises:
combining a gelling agent with the electrolyte solution to form a mixture;
mixing the mixture with an initiator; and
gelling the mixture based on mixing the mixture with the initiator.

19. The method of claim 18, wherein the electrolyte solution comprises an aqueous electrolyte, and wherein the gelling agent comprises acrylic acid.

20. The method of claim 18, wherein the electrolyte solution comprises an ionic liquid, and wherein the gelling agent comprises acrylamide.

21. The method of claim 18, wherein the electrolyte solution comprises an organic electrolyte, and wherein the gelling agent comprises pentaerythritol tetraacrylate.

22. The method of claim 17, wherein at least one of the catholyte solution or the anolyte solution comprises an ionic liquid, and wherein the ionic liquid comprises 1-ethyl-3-methylimidazolium chloride (EMImCl), 1-allyl-3-methylimidazolium bromide, 1-allyl-3-methylimidazolium chloride, 1-butyl-2,3-dimethylimidazolium chloride, 1-ethyl-3-methylimidazolium acetate, 1-ethyl-3-methylimidazolium bromide, 1-ethyl-3-methylimidazolium tetrachloroaluminate, lithium hexafluorophosphate ($LiPF_6$), lithium perchlorate, lithium bis (trifluoromethanesulfonyl) imide, lithium bis (oxalato) borate, and combinations thereof.

23. The method of claim 17, wherein at least one of the catholyte solution or the anolyte solution comprises the organic electrolyte, and wherein the organic electrolyte comprises a salt dissolved in an organic solvent, wherein the organic solvent comprises cyclic carbonates, linear carbonates, dialkyl carbonates, aliphatic carboxylate esters, g-lactones, linear ethers, cyclic ethers, aprotic organic solvents, fluorinated carboxylate esters, and combinations thereof.

24. The method of claim 17, wherein at least one of the catholyte solution or the anolyte solution comprises a water in salt electrolyte, and wherein the water in salt electrolyte comprises water and a salt at a concentration above a saturation point.

\* \* \* \* \*